(12) United States Patent
Yang et al.

(10) Patent No.: US 11,815,291 B2
(45) Date of Patent: Nov. 14, 2023

(54) CONCENTRATED SOLAR POWER GENERATION SYSTEM

(71) Applicants: GUANGDONG POLYTECHNIC NORMAL UNIVERSITY, Guangdong (CN); GUANGZHOU CHANGREN INDUSTRIAL TECHNOLOGY CO., LTD., Guangdong (CN); GUANGDONG NACRE HYDRAULIC CO., LTD., Guangdong (CN); CENTRAL SOUTH UNIVERSITY, Hunan (CN)

(72) Inventors: Yong Yang, Guangdong (CN); Chongjie Zhao, Guangdong (CN); Fu Huang, Guangdong (CN); Shaoming Luo, Guangdong (CN); Guoquan Zhang, Guangdong (CN); Junjie Li, Guangdong (CN); Xiayun Liu, Guangdong (CN); Yulong Yao, Guangdong (CN); Wei Fu, Guangdong (CN); Jian Yang, Hunan (CN)

(73) Assignees: GUANGDONG POLYTECHNIC NORMAL UNIVERSITY, Guangzhou (CN); GUANGDONG NACRE HYDRAULIC CO., LTD., Zhaoqing (CN); CENTRAL SOUTH UNIVERSITY, Changsha (CN)

( * ) Notice: Subject to any disclaimer, the term of this patent is extended or adjusted under 35 U.S.C. 154(b) by 346 days.

(21) Appl. No.: 17/106,154

(22) Filed: Nov. 29, 2020

(65) Prior Publication Data

US 2021/0164694 A1 Jun. 3, 2021

(30) Foreign Application Priority Data

Nov. 29, 2019 (CN) .......................... 201911205141.6

(51) Int. Cl.
*F24S 10/70* (2018.01)
*F24S 30/42* (2018.01)
(Continued)

(52) U.S. Cl.
CPC ................ *F24S 10/72* (2018.05); *F03G 6/06* (2013.01); *F24S 23/31* (2018.05); *F24S 30/42* (2018.05)

(58) Field of Classification Search
CPC ..... F24S 23/75; F24S 2023/84; F24S 2020/23
See application file for complete search history.

(56) References Cited

U.S. PATENT DOCUMENTS 3,254,644 A * 6/1966 Thannhauser ........ F24S 10/746
126/677
3,998,205 A * 12/1976 Scragg ................... B01J 19/127
126/609

(Continued)

FOREIGN PATENT DOCUMENTS

| CN | 105227133 A | 1/2016 |
|----|-------------|--------|
| CN | 105698402 A | 6/2016 |
| EP | 3163214 A1 | 5/2017 |

*Primary Examiner* — Edelmira Bosques
*Assistant Examiner* — Deepak A Deean (57) ABSTRACT

A concentrated solar power generation system includes a movable platform having a groove, a Fresnel lens located in the groove of the movable platform, a header located below the Fresnel lens, a plurality of heat collection tubes arranged in a circular array, a reflector with a tapered surface, and a support base. The header has a water circulation pipe, an inlet pipe and an outlet pipe. The inlet pipe and the outlet pipe each are communicated to the water circulation pipe. A lower end of each of the heat collection tubes is fixed on the support seat, and an upper end of each of the heat collection tubes contacts the water circulation pipe. The reflector is mounted on the support base and located in a space enclosed by the heat collection tubes.

9 Claims, 6 Drawing Sheets

(51) Int. Cl.
*F24S 23/30* (2018.01)
*F03G 6/06* (2006.01)

(56) References Cited

U.S. PATENT DOCUMENTS

| | | | | | |
|---|---|---|---|---|---|
| 4,090,498 | A | * | 5/1978 | Benson | F24S 23/80 60/641.15 |
| 4,148,300 | A | * | 4/1979 | Kaufman, Sr. | F24S 23/00 126/684 |
| 4,173,968 | A | * | 11/1979 | Steward | F24S 20/20 126/696 |
| 4,212,290 | A | * | 7/1980 | Warnken | F24S 23/70 126/684 |
| 4,218,114 | A | * | 8/1980 | Bunch | G02B 7/183 353/3 |
| 4,416,257 | A | * | 11/1983 | Bale | F24S 10/742 126/696 |
| 4,479,485 | A | * | 10/1984 | McDougal | F24S 20/20 126/648 |
| 5,010,873 | A | * | 4/1991 | Hoyle | F24S 70/65 126/698 |
| 5,129,387 | A | * | 7/1992 | Behrens | F23J 13/00 454/367 |
| 5,249,109 | A | * | 9/1993 | Denison | F21V 21/0824 362/153.1 |
| 2010/0206298 | A1 | * | 8/2010 | Karni | F24S 80/60 60/641.15 |
| 2010/0252025 | A1 | * | 10/2010 | Kroizer | F24S 23/80 126/600 |
| 2011/0252797 | A1 | * | 10/2011 | Kobayashi | F02C 6/18 60/641.11 |
| 2011/0314813 | A1 | * | 12/2011 | Cafri | F24S 20/20 126/658 |
| 2012/0160232 | A1 | * | 6/2012 | Mitsuda | F24S 20/20 126/684 |
| 2012/0180483 | A1 | * | 7/2012 | Kobayashi | F03G 6/06 60/641.14 |
| 2012/0291772 | A1 | * | 11/2012 | Atarashiya | F24S 20/20 126/704 |
| 2013/0047610 | A1 | * | 2/2013 | Penton | F22B 1/006 126/645 |
| 2015/0054284 | A1 | * | 2/2015 | Nathan | F24S 20/20 126/714 |
| 2015/0082792 | A1 | * | 3/2015 | Bain | F24S 60/00 60/645 |
| 2015/0083114 | A1 | * | 3/2015 | Liu | F24S 80/60 126/663 |
| 2016/0076791 | A1 | * | 3/2016 | Lehmkuhl Barba | F24S 70/10 126/663 |
| 2017/0145324 | A1 | * | 5/2017 | Kodama | F03G 6/067 |
| 2019/0024642 | A1 | * | 1/2019 | Al-Maaitah | F03G 6/065 |
| 2020/0049134 | A1 | * | 2/2020 | Riyait | F24S 25/00 |

* cited by examiner

CONCENTRATED SOLAR POWER GENERATION SYSTEM

CROSS-REFERENCE TO RELATED APPLICATIONS

This application claims the benefit of priority from Chinese Patent Application No. 201911205141.6, filed on Nov. 29, 2019. The content of the aforementioned application, including any intervening amendments thereto, is incorporated herein by reference in its entirety.

TECHNICAL FIELD

The present application relates to solar energy utilization, and in particular to a concentrated solar power generation system.

BACKGROUND

Currently, the development of economy and society brings higher requirements for energy, and there is an urgent need to find new energy.

Compared with thermal power, hydropower and nuclear power, solar energy is cleaner and safer, and the resource thereof is more sufficient. It has become the most important new energy in the 21st century. However, the solar power generation has poor generation efficiency, low utilization rate and high cost.

SUMMARY

In view of the problems in the prior art, the disclosure aims to provide a concentrated solar power generation system, which can utilize heat energy of solar radiation.

In order to achieve the above objective, the present disclosure adopts the following technical solutions.

Provided is a concentrated solar power generation system, comprising:
  a movable platform having a groove;
  a Fresnel lens located in the groove of the movable platform;
  a header located below the Fresnel lens;
  a plurality of heat collection tubes arranged in a circular array;
  a reflector with a tapered surface; and
  a support base;
  wherein the header has a water circulation pipe, an inlet pipe and an outlet pipe; the inlet pipe and the outlet pipe each are communicated to the water circulation pipe; a lower end of each of the heat collection tubes is fixed on the support seat, and an upper end of each of the heat collection tubes is in contact with the water circulation pipe; the reflector is mounted on the support base and located in a space enclosed by the heat collection tubes; and a light passes through the Fresnel lens and irradiates the reflector.

In some embodiments, the concentrated solar power generation system further comprises:
  a lens holder; and
  a lens cover;
  wherein the lens holder is placed in the groove of the movable platform and fixed on the movable platform; the lens holder is hollow and is provided with an annular groove; the Fresnel lens is placed in the annular groove of the lens holder; and the lens cover covers an edge of the Fresnel lens and the lens holder, and is fixed to the movable platform.

In some embodiments, the concentrated solar power generation system further comprises:
  a lower fixing block fixed on the support base; and
  an upper fixing block fixed to the lower fixing block;
  wherein a tapered groove is formed by the upper fixing block and the lower fixing block, and a lower end of the reflector is inserted into the tapered groove.

In some embodiments, the header comprises:
  a shell;
  a header base;
  an inner liner;
  a thermal insulation layer;
  an upper fixed seat; and
  a lower fixed seat;
  wherein the inner linear of the header comprises the water circulation pipe, the inlet pipe, the outlet pipe, and a plurality of heat conduction blocks which are integrally formed; the inlet pipe and the outlet pipe are symmetrically arranged and are exposed outside the shell; the inlet pipe and the outlet pipe each are communicated to an interior of the water circulation pipe; the water circulation pipe is ring-shaped, and the heat conduction blocks are arranged in a circular array; the heat conduction blocks penetrate through the water circulation pipe or extend into the interior of the water circulation pipe; a bottom of each of the heat conduction blocks has an insert hole, and an upper end of each of the heat collection tubes is inserted into the insert hole of respective heat conduction block; and
  the upper fixed seat and the lower fixed seat are fixed together to form a through hole through which the water circulation pipe passes; the water circulation pipe passes through the upper fixed seat and the lower fixed seat; the lower fixed seat is fixed in the shell, and the thermal insulation layer fills an inside of the shell; the thermal insulation layer wraps the water circulation pipe, the upper fixed seat and the lower fixed seat; the shell has an annular cavity, and a bottom of the shell is fixed on the header base; and a bottom of the header base is provided with a plurality of openings through which the heat collection tubes pass.

In some embodiments, the concentrated solar power generation system further comprises:
  a seat; and
  a plurality of bearing rods spaced apart;
  wherein the plurality of bearing rods comprises a first bearing rod, a second bearing rod and a third bearing rod;
  wherein the seat is located below the support base, and the support base is fixed on the seat; one end of the third bearing rod is connected to the seat, and the other end of the third bearing rod is connected to the support seat; one end of the second bearing rod is connected to the support base, and the other end of the second bearing rod is connected to the header base; and one end of the first bearing rod is connected to the header base, and the other end of the first bearing rod is spherically hinged on the movable platform.

In some embodiments, the concentrated solar power generation system further comprises:
  a lifting mechanism;
  an upper end cover and a lower end cover which are fixed together;

an upper cage and a lower cage which are fixed together; and a ball head;

wherein the ball head is fixed on an output end of the lifting mechanism, and is placed in a first spherical cavity formed by the upper cage and the lower cage; a plurality of steel balls are arranged in the upper cage and the lower cage; the upper cage and the lower cage are placed in a second spherical cavity formed by the upper end cover and the lower end cover; the steel balls are in contact with an inner wall of the second spherical cavity, and the ball head is in contact with an inner wall of the first spherical cavity; the ball head is in contact with the steel balls; and the upper end cover is fixed on the movable platform.

In some embodiments, the lifting mechanism is a ball screw, and the ball head is fixed on an output end of the ball screw; and a center of the Fresnel lens is provided with a rotary cleaning needle.

In some embodiments, the lifting mechanism is a hydraulic cylinder comprising:

a cylinder seat;

a cylinder tube fixed on the cylinder seat;

a piston rod arranged in the cylinder tube;

a cylinder cap fixed at an end of the cylinder tube;

a guide sleeve fixed in the cylinder tube; and a piston fixed on the piston rod;

wherein a fluid inlet and a fluid outlet are provided on the cylinder tube, and the ball head is fixed at an end of the piston rod.

In some embodiments, the concentrated solar power generation system further comprises:

a magnetostrictive displacement sensor;

a movable magnetic ring; and a connecting frame;

wherein one end of the magnetostrictive displacement sensor is fixed on the cylinder base, and the other end of the magnetostrictive displacement sensor is fixed on the cylinder cap; and one end of the connecting frame is fixed on the piston rod, and the other end of the connecting frame is connected to the movable magnetic ring.

In some embodiments, the concentrated solar power generation system further comprises:

a waste heat recovery device; and a turbine generator;

wherein the outlet pipe is connected to the turbine generator; the waste heat recovery device has an input port and an output port; the turbine generator has a waste heat port; and the input port of the waste heat recovery device is communicated to the waste heat port of the turbine generator, and the output port of the waste heat recovery device is communicated to the inlet pipe.

The present invention has the following beneficial effects.

The concentrated solar power generation system of the present invention is able to utilize the thermal energy of sunlight to heat water. The water is heated to generate steam to produce electricity. The Fresnel lens is mounted in the groove of the movable platform by using the lens holder and the lens cover, and the light directly shines on the Fresnel lens. The upper fixing block and the lower fixing block can fix the conical reflector on the support base. The combination of the header, the heat collection tubes and the reflector can realize the utilization of sunlight. The movable platform bears the gravity of the header, the heat collection tubes, the support seat and the base through the bearing rods, and the lifting mechanism bears the gravity of the movable platform.

The magnetostrictive displacement sensor cooperates with the movable magnetic ring to detect the displacement value of the piston rod. The cleaning needle can sweep dust or fallen leaves on the Fresnel lens, so as to avoid depositing of the dust or fallen leaves.

In the drawings: 1, movable platform; 2, header; 3, header base; 4, heat collection tube; 5, reflector; 6, support base; 7, seat; 8, first bearing rod; 9, second bearing rod; 10, third bearing rod; 11, hydraulic cylinder; 12, fixed platform; 13, automatic tracking sensor; 14, Fresnel lens; 15, lens cover; 16, lens holder; 17, first hollow area; 18, third hollow area; 19, lower fixing block; 20, upper fixing block; 21, water circulation pipe; 22, inlet pipe; 23, outlet pipe; 24, upper fixed seat; 25, lower fixed seat; 26, second hollow area; 27, heat conduction block; 28, insert hole; 29, upper end cover; 30, lower end cover; 31, upper cage; 32, lower cage; 33, steel ball; 34, ball head; 35, piston rod; 36, cylinder seat; 37, cylinder tube; 38, cylinder cap; 39, guide sleeve; 40, piston; 41, magnetostrictive displacement sensor; 42, movable magnetic ring; 43, connecting frame

DETAILED DESCRIPTION OF EMBODIMENTS

The present disclosure will be further described in detail below in conjunction with the drawings and embodiments.

Figure 1:
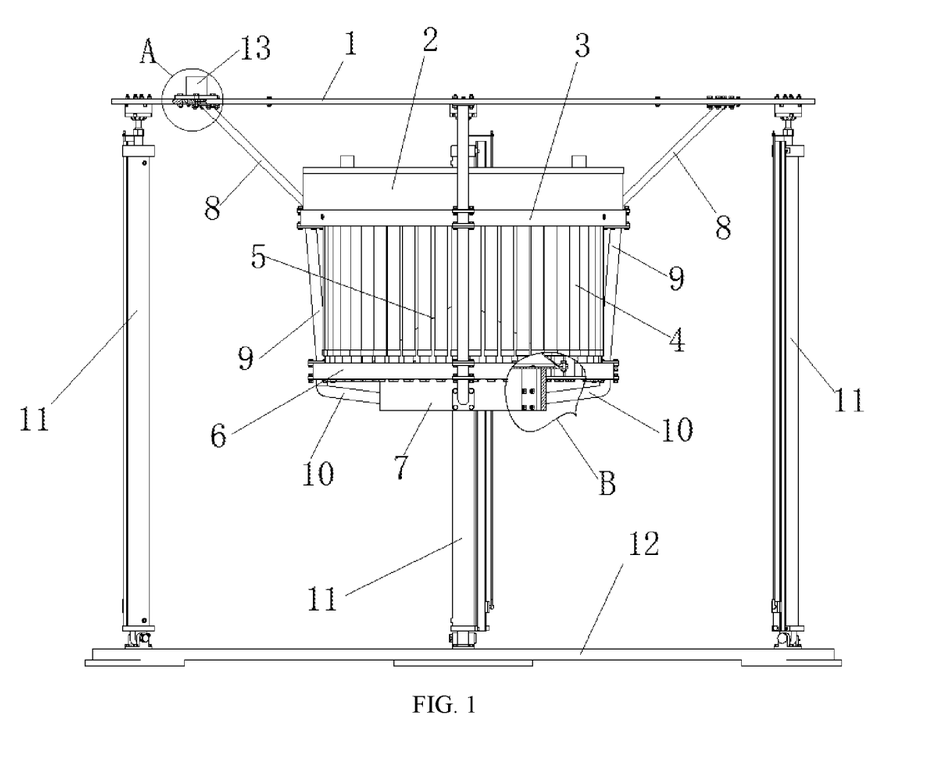
FIG. 1 is a schematic diagram of a concentrated solar power generation system according to an embodiment of the present disclosure.

As shown in FIG. 1, illustrated is a concentrated solar power generation system, including a movable platform 1 which is hollow and has a groove, a Fresnel lens 14 located in the groove of the movable platform 1, a header 2 located below the Fresnel lens 14, a plurality of heat collection tubes 4 arranged in a circular array, a reflector 5 with a tapered surface, and a support base 6. A center of the movable platform 1 has a first hollow area 17, that is, a through hole is provided in the movable platform 1, and the groove which is annular is provided at an edge of the first hollow area 17. The Fresnel lens is placed in the groove through other parts (mentioned below). The header is located directly below the Fresnel lens. The header 2 is also hollow and has a second hollow area 26. The header 2 has a water circulation pipe 21, an inlet pipe 22 and an outlet pipe 23. The inlet pipe 22 and the outlet pipe 23 each are communicated to an interior of the water circulation pipe 21. A lower end of each of the heat collection tubes 4 is fixed on the support seat 6, and an upper end of each of the heat collection tubes 4 is in contact with the water circulation pipe 21. The header 2, the heat collection tubes 4, and the support base 6 are arranged from top to bottom in sequence. The reflector 5 is mounted on the support base 6, and the heat collection tubes 4 are vertically and evenly arranged along a circumferential direction, that is, in a circular array. The reflector 5 is located in a space enclosed by the heat collection tubes 4, that is, the heat collection tubes 4 are distributed around the reflector 5. The reflector 5 is a uniform reflector and has a conical shape. A light passes through the Fresnel lens 14 and then shines on the reflector 5, that is, the light first shines on the Fresnel lens 14, and then passes through the second hollow area of the header 2 and then shines on the reflector 5. The heat collection tubes 4 are existing vacuum collection tubes of the heat pipe type, which can absorb the energy of sunlight and generate heat energy.

Figure 2:
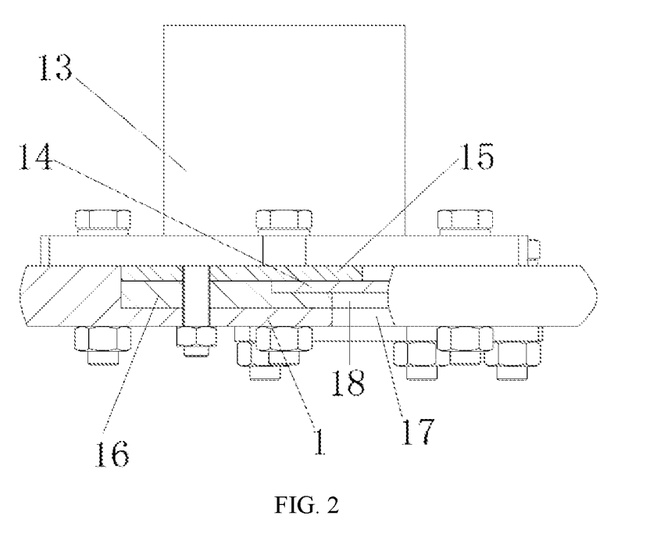
FIG. 2 is an enlarged view of area A in FIG. 1.

As shown in FIGS. 1-2, the concentrated solar power generation system also includes a lens holder 16 and a lens cover 15. The lens holder 16 has a third hollow area 18, and is ring-shaped. The lens holder 16 is placed in the groove of the movable platform 1 and fixed on the movable platform 1. The lens holder 16 is provided with an annular groove, and the Fresnel lens 14 is placed in the annular groove of the lens holder 16. The lens cover 15 is also hollow and ring-shaped, the lens cover 15 covers an edge of the Fresnel lens 14 and the lens holder 16, and the lens cover 15 is fixed to the movable platform 1. The lens holder 16 and the lens cover 15 may be fixed on the movable platform 1 through bolts, and the lens holder 16 and the lens cover 15 are adopted to mount the Fresnel lens 14 in the groove of the movable platform 1, so that the sunlight directly shines on the Fresnel lens 14.

Figure 3:
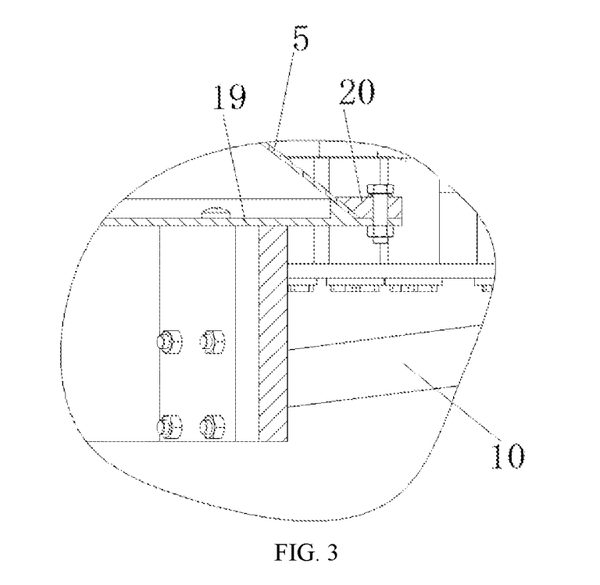
FIG. 3 is an enlarged view of area B in FIG. 1.
Figure 4:
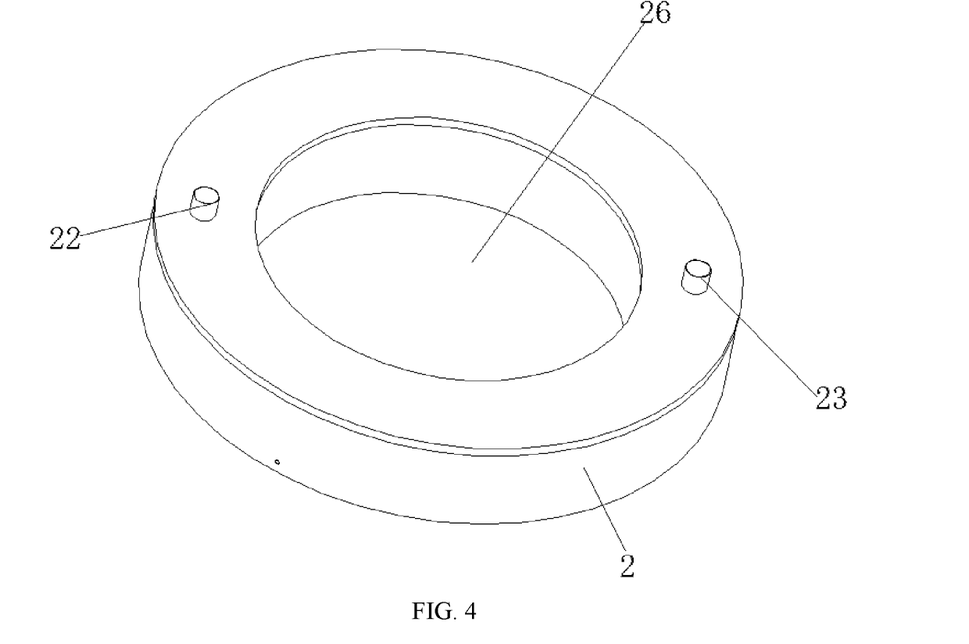
FIG. 4 is a perspective view of a header according to an embodiment of the present disclosure.

As shown in FIGS. 1 and 3, the concentrated solar power generation system further includes a lower fixing block 19 fixed on the support base 6, and an upper fixing block 20 fixed to the lower fixing block 19. The lower fixing block 19 can be fixed on the support base 6 by bolts, and the upper fixing block 20 and the lower fixing block 19 are fixed together by bolts. A tapered groove is formed by the upper fixing block 20 and the lower fixing block 19, and a lower end of the reflector 5 is inserted into the tapered groove. In this way, the reflector 5 which is tapered can be fixed on the support base 6.

Figure 5:
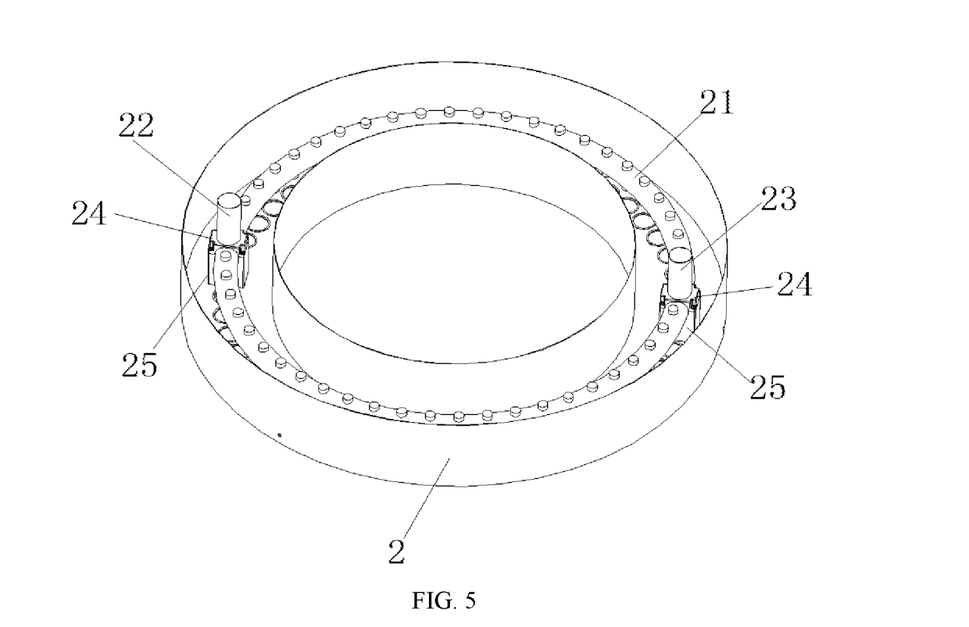
FIG. 5 is a schematic diagram of an internal structure of the header according to an embodiment of the present disclosure.

As shown in FIGS. 1 and 4-7, the header 2 includes a shell, a header base 3, an inner liner, a thermal insulation layer, an upper fixed seat 24 and a lower fixed seat 25. The water circulation pipe, the inlet pipe and the outlet pipe mentioned above are parts of the inner liner of the header 2. The inner linear of the header 2 includes the water circulation pipe 21, the inlet pipe 22, the outlet pipe 23, and a plurality of heat conduction blocks 27 which are integrally formed. The inlet pipe 22 and the outlet pipe 23 are symmetrically arranged, and a connecting line of the inlet pipe 22 and the outlet pipe 23 passes through a center of the water circulation pipe 21. The water circulation pipe 21 is horizontally arranged, and the inlet pipe 22 and the outlet pipe 23 are vertically arranged. The inlet pipe 22 and the outlet pipe 23 are exposed outside the shell and are communicated to an interior of the water circulation pipe 21. As shown in FIG. 5, the water circulation pipe 21 is ring-shaped, and the heat conduction blocks are arranged in a circular array, that is, the heat conduction blocks 27 are evenly distributed on the water circulation pipe 21 along a circumference of the water circulation pipe 21. The heat conduction blocks 27 and the water circulation pipe 21 are integrally formed, and the heat conduction blocks 27 penetrate through the water circulation pipe 21 or extend into the interior of the water circulation pipe 21.

Figure 6:
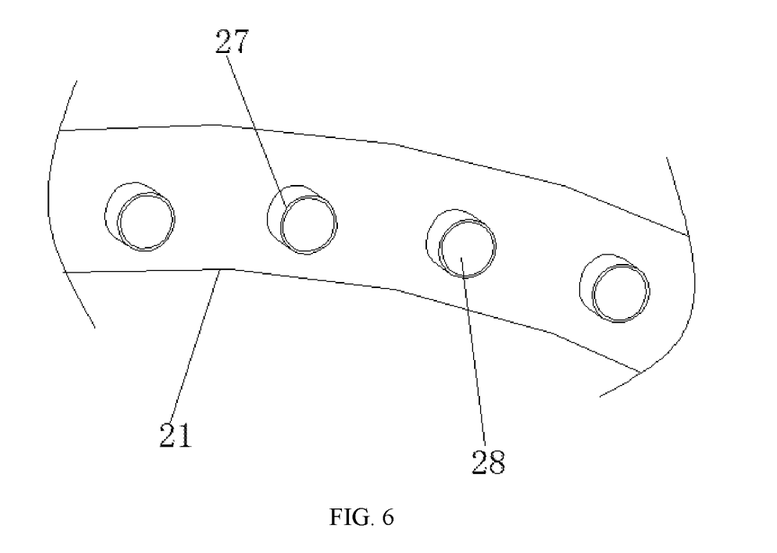
FIG. 6 is a partial schematic diagram of a water circulation pipe according to an embodiment of the present disclosure.
Figure 7:
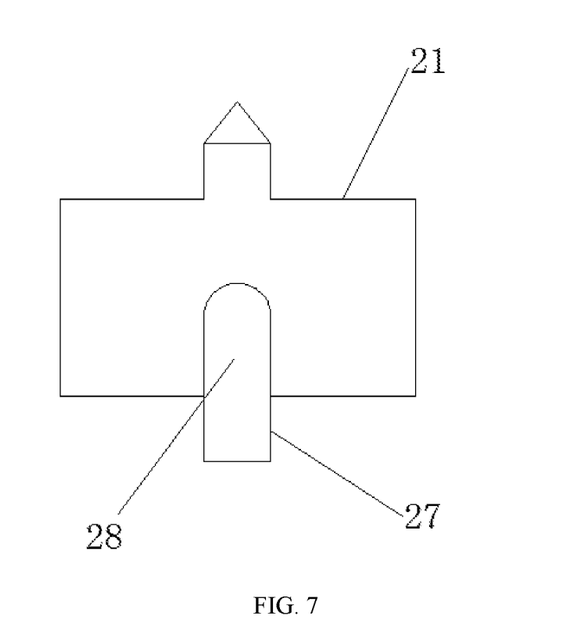
FIG. 7 is a schematic diagram of the water circulation pipe and a heat conduction block according to an embodiment of the present disclosure.

As shown in FIGS. 6-7, a bottom of each of the heat conduction blocks 27 has an insert hole 28, and an upper end of each of the heat collection tubes 4 is inserted into the insert hole 28 of respective heat conduction block 27. The upper fixed seat 24 and the lower fixed seat 25 are fixed together to form a through hole through which the water circulation pipe 21 passes. The water circulation pipe 21 passes through the upper fixed seat 24 and the lower fixed seat 25 from the through hole. The lower fixed seat 25 is fixed in the shell, and the thermal insulation layer fills an inside of the shell, and the thermal insulation layer wraps the water circulation pipe 21, the upper fixed seat 24 and the lower fixed seat 25. The hollow shell has an annular cavity, and the inner linear of the header 2 and the thermal insulation layer are located in the annular cavity. A bottom of the shell is fixed on the header base 3. The header base 3 is also hollow and ring-shaped, and the arrangement of the header base 3 can prevent the shell from rotating. A bottom of header base 3 is provided with a plurality of openings through which the heat collection tubes pass, and an upper end of each of the heat collection tube 4 passes through respective opening on the header base 3 and the shell in turn, and finally is inserted into the insert hole 28 of respective heat conduction block 27.

As shown in FIG. 1, the concentrated solar power generation system further includes a seat 7 and a plurality of bearing rods spaced apart. The plurality of bearing rods comprises a first bearing rod 8, a second bearing rod 9 and a third bearing rod 10. The first bearing rod 8, the second bearing rod 9 and the third bearing rod 10 are integrally or not integrally formed, that is, the first bearing rod 8, the second bearing rod 9, and the third bearing rod 10 may be integrally formed, or may be separate components. The seat 7 is located below the support base 6, and the support base 6 is fixed on the seat 7. One end of the third bearing rod 10 is connected to the seat 7, and the other end of the third bearing rod 10 is connected to the support seat 6. One end of the second bearing rod 9 is connected to the support base 6, and the other end of the second bearing rod 9 is connected to the header base 3. One end of the first bearing rod 8 is connected to the header base 3, and the other end of the first bearing rod 8 is spherically hinged on the movable platform 1. If the first bearing rod 8, the second bearing rod 9, and the third bearing rod 10 are integrally formed, the structure formed by the first bearing rod 8, the second bearing rod 9, and the third bearing rod 10 passes through the support base 6 and the header base 3 in sequence. The movable platform 1 bears the gravity of the header 2, the heat collection tubes 4, the support base 6 and the seat 7 through the bearing rods. In addition, the end of the first bearing rod 8 (an upper end of the bearing rod) is spherically hinged on the movable platform 1, that is, the first bearing rod can rotate within a certain range with respect to the movable platform 1.

Figure 8:
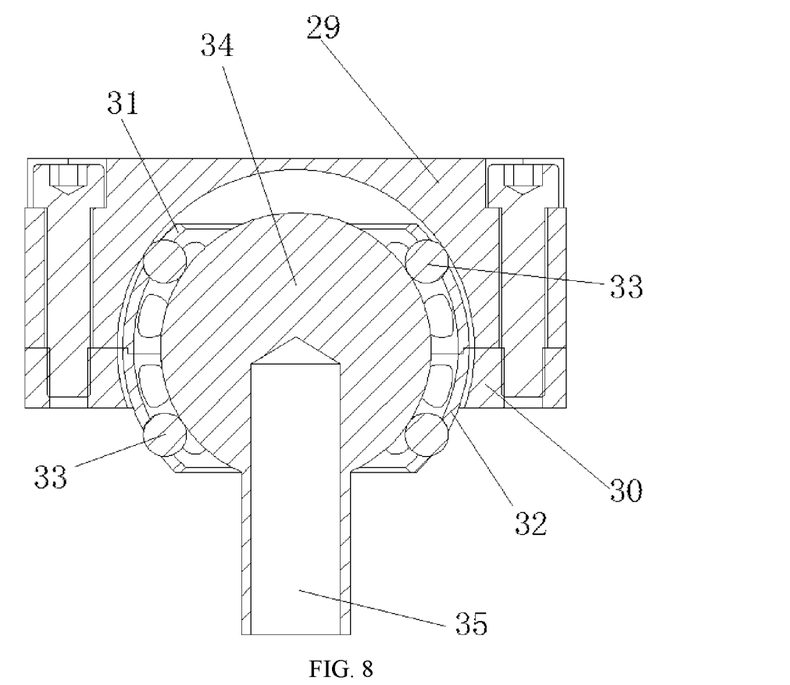
FIG. 8 is a schematic diagram of a structure formed by upper and lower end caps, upper and lower cages and a ball head according to an embodiment of the present disclosure.

As shown in FIGS. 1 and 8, the concentrated solar power generation system further includes a lifting mechanism, an upper end cover 29 and a lower end cover 30 which are fixed together, an upper cage 31 and a lower cage 32 which are fixed together, and a ball head 34. The ball head 34 is fixed on an output end of the lifting mechanism. The upper cage 31 and the lower cage 32 form a first spherical cavity, and the ball head 34 is placed in the first spherical cavity formed by the upper cage 31 and the lower cage 32. A plurality of steel balls 33 are arranged in the upper cage 31 and the lower cage 32, and the steel balls of the upper cage 31 and the lower cage 32 are partially exposed. The upper cage 31 and the lower cage 32 are placed in a second spherical cavity formed by the upper end cover 29 and the lower end cover 30. The steel balls 33 are in contact with an inner wall of the second spherical cavity, and the ball head 34 is in contact with an inner wall of the first spherical cavity, and the ball head 34 is in contact with the steel balls 33. The upper end cover 29 is fixed on the movable platform 1. There are three lifting mechanisms which are evenly distributed along the circumferential direction. The lifting mechanisms are configured to lift the movable platform 1, and adjust an inclination angle of the movable platform 1. When the three lifting mechanisms have different heights, the ball heads corresponding to the three lifting mechanisms are located at different heights, which causes the upper end cover 29 and the lower end cover 30 to rotate within a certain range with respect to the cages (the upper cage 31 and the lower cage 32), so as to adjust the inclination of the movable platform 1.

In some embodiments, the lifting mechanism is a ball screw, and the ball head 34 is fixed on an output end of the ball screw. Through the ball screw, the movable platform 1 can move up and down, and the inclination can be adjusted.

Figure 9:
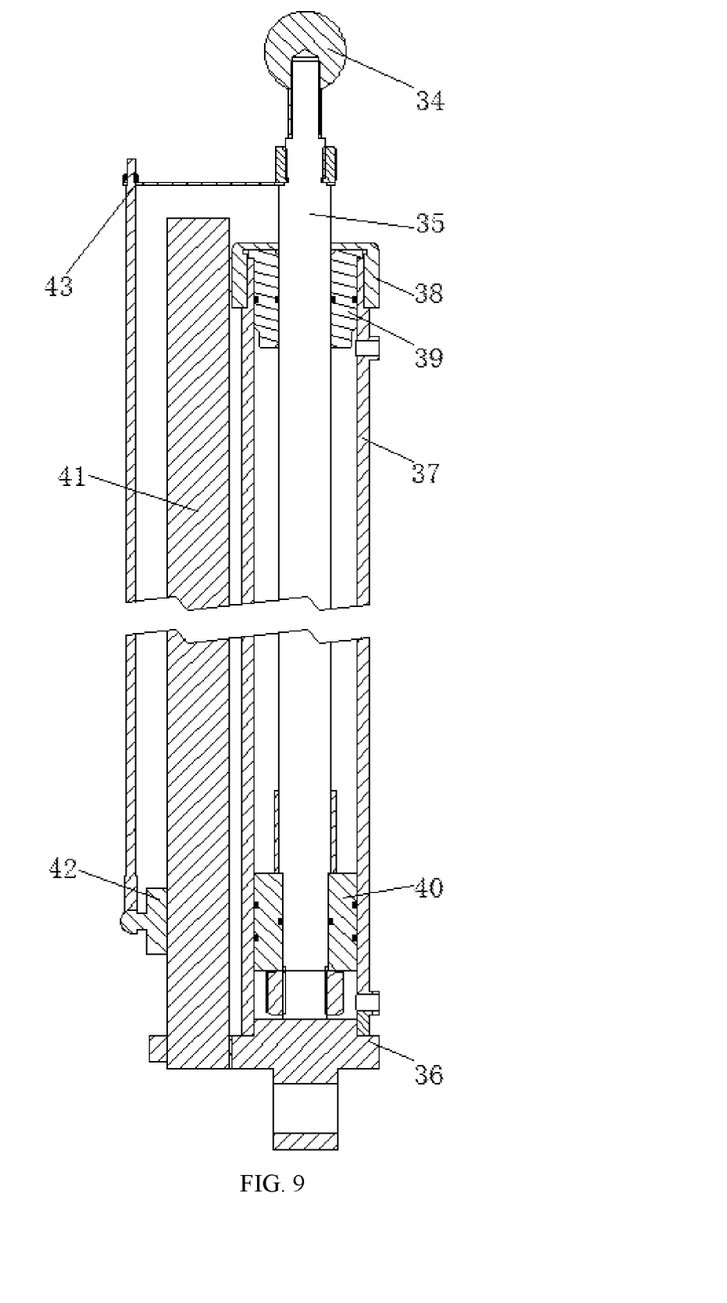
FIG. 9 is a schematic diagram of a hydraulic cylinder according to an embodiment of the present disclosure.

In some embodiments, as shown in FIGS. 1 and 9, the lifting mechanisms are hydraulic cylinders 11. The hydraulic cylinder 11 includes a cylinder seat 36, a cylinder tube 37 fixed on the cylinder seat 36, a piston rod 35 arranged in the cylinder tube 37, a cylinder cap 38 fixed at an end (an upper end) of the cylinder tube 37, a guide sleeve 39 fixed in the cylinder tube 37, a piston 40 fixed on the piston rod 35. The concentrated solar power generation system further includes a fixed platform 12. The fixed platform 12 is located at the bottom, and the cylinder base 36 is rotatably mounted on the fixed platform 12, and the hydraulic cylinder 11 can also be kept upright. The piston rod 35 is located in the cylinder tube 37 and passes through the cylinder cup 38. The guide sleeve 39 is configured to guide the movement of the piston rod 35. The piston 40 is arranged on the piston rod 35, and the piston 40 and the piston rod 35 are fixed. A fluid inlet and a fluid outlet are provided on the cylinder tube 37, and the ball head 34 is fixed at an end of the piston rod 35. The fluid inlet may be an oil inlet or an air inlet, and the fluid outlet may be an oil outlet or an air outlet. In this way, the piston rod 35 can drive the ball head 34 to move up and down, thereby realizing the vertical movement of the movable platform 1 and the adjustment for inclination. The lifting mechanism bears the gravity of the movable platform 1.

As shown in FIGS. 1 and 9, the concentrated solar power generation system further includes a magnetostrictive displacement sensor 41, a movable magnetic ring 42, and a connecting frame 43. The magnetostrictive displacement sensor 41 and the movable magnetic ring 42 belongs to the prior art. One end of the magnetostrictive displacement sensor 41 is fixed on the cylinder base 36, and the other end of the magnetostrictive displacement sensor 41 is fixed on the cylinder cap 38. The magnetostrictive displacement sensor 41 is fixed. One end of the connecting frame 43 is fixed on the piston rod 35, and the other end of the connecting frame 43 is connected to the movable magnetic ring 42. When the piston rod 35 moves up and down, the movable magnetic ring 42 is driven to move up and down through the connecting frame 43. The magnetostrictive displacement sensor 41 cooperates with the movable magnetic ring 42 to detect the displacement value of the piston rod 35.

A center of the Fresnel lens is provided with a rotary cleaning needle (not shown). After the concentrated solar power generation system is used a period of time, dust or fallen leaves will be inevitably deposited on the Fresnel lens, which will affect the light passing through the Fresnel lens.

In order to realize the power generation, the concentrated solar power generation system further includes a turbine generator. The outlet pipe is connected to the turbine generator, so that the steam from the outlet pipe enters the turbine generator.

The working principles of the concentrated solar power generation system are described as follows. The height and the inclination of the movable platform 1 are adjusted through the lifting mechanisms, so that the Fresnel lens 14 is perpendicular to the sunlight all the time. After passing through the Fresnel lens 14, the sunlight is focused on the reflector 5, and then reflected to the heat collection tubes 4 through the reflection of the reflector 5. Then, the heat collection tubes 4 absorb the energy of the light to generate heat energy, and the heat energy is conducted into the heat conduction blocks 27. The heat conduction blocks 27 heat the water in the water circulation pipe 21. When the water in the water circulation pipe 21 is heated to a certain temperature, the water is vaporized to form steam, and the steam enters the external turbine generator to push the turbine generator to rotate at a high speed, thereby driving the concentrated solar power generation system to generate electricity. A valve in the inlet pipe 22 is opened, and water can be added to the water circulation pipe 21.

The concentrated solar power generation system further includes a waste heat recovery device having at least one input port and at least one output port. The turbine generator has a waste heat port. The input port of the waste heat recovery device is communicated to the waste heat port of the turbine generator, and the output port of the waste heat recovery device is communicated to the inlet pipe 22. After the steam enters the turbine generator, waste hot water is produced, and the waste hot water flows through the waste heat recovery device. After the waste heat recovery device recovers the waste hot water, the waste hot water flows out from the output port of the waste heat recovery device, and then enters the inlet pipe 22. The waste hot water flows into the water circulation pipe 21 through the inlet pipe 22. Since the waste hot water has a certain temperature, the production of water steam is accelerated. The waste heat recovery device recovers the steam that drives the turbine generator to rotate at a high speed to generate medium temperature water (waste hot water), and then sends this medium temperature water to the header 2. Through the water circulation pipe 21, the steam generation process of the concentrated solar power generation system is accelerated, so that the waste heat of the turbine generator is circularly utilized, thus improving the efficiency of the concentrated solar power generation system.

A principle of a control system involved in the concentrated solar power generation system is known in the prior art. One control principle is to mount an automatic tracking sensor 13 on the movable platform 1. The automatic tracking sensor 13 senses whether the sun's rays are perpendicular to a plane of the Fresnel lens 5. When the sun's rays are not perpendicular to the plane of the Fresnel lens 5, the automatic tracking sensor 13 will output a deviation signal, and then the signal is amplified and sent to the controller. The controller controls the hydraulic cylinder 11 to work to adjust the height and the inclination of the movable platform 1, so that the sun's rays are perpendicular to the plane of the Fresnel lens 5.

The control principle of the hydraulic cylinder 11 is described as follows. When receiving the signal, the controller performs the inverse solution for the movable platform to solve the elongation required by each hydraulic cylinder by transforming the model of the space motion, and then the command signal is converted into an analog quantity for the hydraulic cylinder 11. At the same time, the extension length of the piston rod 35 of the hydraulic cylinder 11 can be measured by the magnetostrictive displacement sensor 41, and fed back to the controller for comparison. The controller controls and adjusts the position of the piston rod 35 of each hydraulic cylinder 11, so as to complete required actions through the cooperation of the hydraulic cylinders 11. The above-mentioned control principle is not intended to limit the scope of the present disclosure, and other control principles in the prior art may be adopted to realize the automatic control.

The above are only the preferred embodiments of the present disclosure, and are not intended to limit the scope of the present disclosure. Any changes, equivalent modifications and improvements made by those skilled in the art without departing from the spirit of the present disclosure shall fall within the scope of the present disclosure.

What is claimed is:

1. A concentrated solar power generation system, comprising:
    a movable platform having a groove;
    a Fresnel lens located in the groove of the movable platform;
    a header located below the Fresnel lens;
    a plurality of heat collection tubes arranged in a circular array;
    a reflector with a tapered surface; and
    a support base;
    wherein the header has a water circulation pipe, an inlet pipe and an outlet pipe;
    the inlet pipe and the outlet pipe each are communicated to the water circulation pipe;
    a lower end of each of the heat collection tubes is fixed on a support seat, and an upper end of each of the heat collection tubes is in contact with the water circulation pipe; the reflector is mounted on the support base and located in a space enclosed by the heat collection tubes; and a light passes through the Fresnel lens and shines on the reflector;
    wherein the header comprises:
        a shell;
        a header base;
        an inner liner;
        a thermal insulation layer;
        an upper fixed seat; and
        a lower fixed seat;
        wherein the inner linear of the header comprises the water circulation pipe, the inlet pipe, the outlet pipe, and a plurality of heat conduction blocks which are integrally formed; the inlet pipe and the outlet pipe are symmetrically arranged and are exposed outside the shell; the inlet pipe and the outlet pipe each are communicated to an interior of the water circulation pipe; the water circulation pipe is ring-shaped, and the heat conduction blocks are arranged in a circular array; the heat conduction blocks penetrate through the water circulation pipe or extend into the interior of the water circulation pipe; a bottom of each of the heat conduction blocks has an insert hole, and an upper end of each of the heat collection tubes is inserted into the insert hole of respective heat conduction block; and
        the upper fixed seat and the lower fixed seat are fixed together to form a through hole through which the water circulation pipe passes; the water circulation pipe passes through the upper fixed seat and the lower fixed seat; the lower fixed seat is fixed in the shell, and the thermal insulation layer fills an inside of the shell; the thermal insulation layer wraps the water circulation pipe, the upper fixed seat and the lower fixed seat; the shell has an annular cavity, and a bottom of the shell is fixed on the header base; and a bottom of the header base is provided with a plurality of openings through which the heat collection tubes pass.

2. The concentrated solar power generation system of claim 1, further comprising:
    a lens holder; and
    a lens cover;
    wherein the lens holder is placed in the groove of the movable platform and fixed on the movable platform; the lens holder is hollow and is provided with an annular groove; the Fresnel lens is placed in the annular groove of the lens holder; and the lens cover covers an edge of the Fresnel lens and the lens holder, and is fixed to the movable platform.

3. The concentrated solar power generation system of claim 1, further comprising:
    a lower fixing block fixed on the support base; and
    an upper fixing block fixed to the lower fixing block;
    wherein a tapered groove is formed by the upper fixing block and the lower fixing block, and a lower end of the reflector is inserted into the tapered groove.

4. The concentrated solar power generation system of claim 1, further comprising:
    a seat; and
    a plurality of bearing rods spaced apart;
    wherein the plurality of bearing rods comprises a first bearing rod, a second bearing rod and a third bearing rod;
    the seat is located below the support base, and the support base is fixed on the seat; one end of the third bearing rod is connected to the seat, and the other end of the third bearing rod is connected to the support seat; one end of the second bearing rod is connected to the support base, and the other end of the second bearing rod is connected to the header base; and one end of the first bearing rod is connected to the header base, and the other end of the first bearing rod is spherically hinged on the movable platform.

5. The concentrated solar power generation system of claim 1, further comprising:
    a waste heat recovery device; and
    a turbine generator;
    wherein the outlet pipe is connected to the turbine generator; the waste heat recovery device has an input port and an output port; the turbine generator has a waste heat port; and the input port of the waste heat recovery device is communicated to the waste heat port of the turbine generator, and the output port of the waste heat recovery device is communicated to the inlet pipe.

6. A concentrated solar power generation system comprising:
    a movable platform having a groove;
    a Fresnel lens located in the groove of the movable platform;
    a header located below the Fresnel lens;
    a plurality of heat collection tubes arranged in a circular array;
    a reflector with a tapered surface;
    a support base;

a lifting mechanism;

an upper end cover and a lower end cover which are fixed together;

an upper cage and a lower cage which are fixed together; and a ball head;

wherein the header has a water circulation pipe, an inlet pipe and an outlet pipe; the inlet pipe and the outlet pipe each are communicated to the water circulation pipe; a lower end of each of the heat collection tubes is fixed on a support seat, and an upper end of each of the heat collection tubes is in contact with the water circulation pipe; the reflector is mounted on the support base and located in a space enclosed by the heat collection tubes; and a light passes through the Fresnel lens and shines on the reflector; and the ball head is fixed on an output end of the lifting mechanism, and is placed in a first spherical cavity formed by the upper cage and the lower cage; a plurality of steel balls are arranged in the upper cage and the lower cage; the upper cage and the lower cage are placed in a second spherical cavity formed by the upper end cover and the lower end cover; the steel balls are in contact with an inner wall of the second spherical cavity, and the ball head is in contact with an inner wall of the first spherical cavity; the ball head is in contact with the steel balls; and the upper end cover is fixed on the movable platform.

7. The concentrated solar power generation system of claim 6, wherein the lifting mechanism is a ball screw, and the ball head is fixed on an output end of the ball screw; and a center of the Fresnel lens is provided with a rotary cleaning needle.

8. The concentrated solar power generation system of claim 6, wherein the lifting mechanism is a hydraulic cylinder comprising:

a cylinder seat;

a cylinder tube fixed on the cylinder seat;

a piston rod arranged in the cylinder tube;

a cylinder cap fixed at an end of the cylinder tube;

a guide sleeve fixed in the cylinder tube; and a piston fixed on the piston rod;

wherein a fluid inlet and a fluid outlet are provided on the cylinder tube, and the ball head is fixed at an end of the piston rod.

9. The concentrated solar power generation system of claim 8, further comprising:

a magnetostrictive displacement sensor;

a movable magnetic ring; and a connecting frame;

wherein one end of the magnetostrictive displacement sensor is fixed on the cylinder base, and the other end of the magnetostrictive displacement sensor is fixed on the cylinder cap; and one end of the connecting frame is fixed on the piston rod, and the other end of the connecting frame is connected to the movable magnetic ring.

* * * * *